United States Patent
Gal

(10) Patent No.: US 10,850,230 B2
(45) Date of Patent: Dec. 1, 2020

(54) PROCESS AND SYSTEM FOR REMOVING SULFUR DIOXIDE FROM FLUE GAS

(71) Applicant: Marsulex Environmental Technologies, Corp., Lebanon, PA (US)

(72) Inventor: Eli Gal, Sunnyvale, CA (US)

(73) Assignee: Marsulex Environmental Technologies Corporation, Lebanon, PA (US)

( * ) Notice: Subject to any disclaimer, the term of this patent is extended or adjusted under 35 U.S.C. 154(b) by 17 days.

(21) Appl. No.: 16/049,022

(22) Filed: Jul. 30, 2018

(65) Prior Publication Data

US 2018/0353899 A1 Dec. 13, 2018

Related U.S. Application Data

(62) Division of application No. 14/923,730, filed on Oct. 27, 2015, now Pat. No. 10,046,272.

(51) Int. Cl.
| | |
|---|---|
| *B01D 53/50* | (2006.01) |
| *B01D 53/73* | (2006.01) |
| *C01D 5/08* | (2006.01) |
| *B01D 53/78* | (2006.01) |

(52) U.S. Cl.
CPC .......... *B01D 53/502* (2013.01); *B01D 53/73* (2013.01); *B01D 53/78* (2013.01); *C01D 5/08* (2013.01); *B01D 2251/108* (2013.01); *B01D 2251/206* (2013.01); *B01D 2251/306* (2013.01); *B01D 2258/0283* (2013.01)

(58) Field of Classification Search
USPC .................................................. 423/243.06
See application file for complete search history.

(56) References Cited

U.S. PATENT DOCUMENTS

| | | | |
|---|---|---|---|
| 5,624,649 A * | 4/1997 | Gal ...................... | B01D 53/501 423/199 |
| 2014/0050651 A1 * | 2/2014 | Xu ........................ | B01D 53/507 423/420 |

* cited by examiner

*Primary Examiner* — Anita Nassiri-Motlagh
(74) *Attorney, Agent, or Firm* — Hartman Global IP Law; Gary M. Hartman; Domenica N. S. Hartman

(57) ABSTRACT

Processes and systems for producing potassium sulfate as a byproduct of a desulfurization process. Sulfur dioxide is absorbed from a flue gas using an ammonia-containing solution to produce an ammonium sulfate solution that contains dissolved ammonium sulfate. At least a first portion of the ammonium sulfate solution is heated before dissolving potassium chloride therein to form a slurry that contains potassium sulfate crystals and an ammonium chloride solution. The slurry is then cooled to precipitate additional potassium sulfate crystals, after which the potassium sulfate crystals are removed to yield a residual ammonium chloride solution that contains dissolved ammonium chloride and residual dissolved potassium sulfate. Ammonia is then absorbed into the residual ammonium chloride solution to further precipitate potassium sulfate crystals, which are removed to yield a residual ammonium chloride solution that is substantially free of dissolved potassium sulfate.

8 Claims, 2 Drawing Sheets

PROCESS AND SYSTEM FOR REMOVING SULFUR DIOXIDE FROM FLUE GAS

CROSS REFERENCE TO RELATED APPLICATIONS

This is a division patent application of co-pending U.S. patent application Ser. No. 14/923,730, filed Oct. 27, 2015. The contents of this prior application is incorporated herein by reference.

BACKGROUND OF THE INVENTION

The present invention generally relates to processes, systems, and equipment capable of removing gases and particulate matter and gases from flue gases. The invention particularly relates to wet flue gas desulfurization (FGD) processes, systems, and equipment with which potassium sulfate can be produced as a byproduct of sulfur dioxide removal from flue gases using an ammonia-containing solution.

Gas-liquid contactors and absorbers are widely used to remove substances such as gases and particulate matter from combustion or flue gases produced by utility and industrial plants. Often of particular concern are sulfur dioxide ($SO_2$) and other acidic gases produced by the combustion of fossil fuels and various industrial operations. Such gases are known to be hazardous to the environment, and their emission into the atmosphere is regulated by clean air statutes. Methods by which these gases are removed with gas-liquid contactors and absorbers have been referred to as wet flue gas desulfurization.

The cleansing action produced by a gas-liquid contactor is generally derived from the passage of gas through a tower cocurrently or countercurrently to a descending liquid that cleans the gas. Wet flue gas desulfurization processes have typically involved the use of calcium-based slurries or sodium-based or ammonia-based solutions. Examples of calcium-based slurries are limestone (calcium carbonate; $CaCO_3$) slurries and hydrated lime (calcium hydroxide; $Ca(OH)_2$) slurries formed by action of water on lime (calcium oxide; CaO). Such alkaline slurries react with the acidic gases to form precipitates that can be collected for disposal or recycling. Intimate contact between the alkaline slurry and acidic gases that are present in the flue gases, such as sulfur dioxide, hydrogen chloride (HCl) and hydrogen fluoride (HF), result in the absorption of the gases by the slurry and the formation of salts such as, in the case of calcium-based slurries, calcium sulfite ($CaSO_3 \cdot \frac{1}{2}H_2O$), gypsum ($CaSO_4 \cdot 2H_2O$), calcium chloride ($CaCl_2$), and calcium fluoride ($CaF_2$). Forced oxidation of the slurry by aeration is often employed to ensure that all of the sulfites will be reacted to form sulfates, which in the case of a calcium-based slurry serves to maximize the production of gypsum.

While gas-liquid contactors and absorbers utilizing calcium-based slurries as described above generally perform satisfactorily, their operation results in the production of large quantities of wastes or gypsum, the latter often having only nominal commercial value. In contrast, ammonia-based scrubbing processes produce a more valuable ammonium sulfate fertilizer. In these processes, sulfur dioxide within the flue gas reacts with ammonia ($NH_3$) to form an ammonium sulfate solution or ammonium sulfate crystals (($NH_4)_2SO_4$). A particular example of such a process is disclosed in U.S. Pat. No. 5,362,458 and results in the production of ammonium sulfate fertilizer by reacting sulfur dioxide and free ammonia ($NH_3$) in an ammonia-containing scrubbing solution. In certain markets, the added value of ammonium sulfate over the value of ammonia is minimal. In addition, some prior art processes have required bulk supplies of ammonia that are consumed by the desulfurization process, necessitating the transportation and on-site storage of large quantities of ammonia. Because transportation and storage of ammonia are highly regulated and relatively costly, under certain circumstances the production of ammonium sulfate using flue gas desulfurization systems has been viewed by some in the industry as better suited for use in niche markets.

U.S. Pat. No. 5,624,649 discloses a process capable of enhancing economic aspects of desulfurization processes by producing a byproduct having of greater market value than ammonium sulfate. In particular, U.S. Pat. No. 5,624,649 discloses reacting flue gases with ammonia to form an ammonium sulfate solution, and then reacting the ammonium sulfate solution with potassium chloride (KCl) to produce potassium sulfate ($K_2SO_4$) in a manner than is capable of achieving a high yield of both potassium and sulfate. While the process is very effective for its intended purpose, the resulting potassium sulfate crystals may be small (for example, an average major dimension of 0.2 mm or less) and therefore somewhat difficult to filter and subsequently handle. In addition, certain steps of the process involve handling a solution, slurry, or other material that may contain a high concentration of free ammonia ($NH_3$), which can lead to higher operating costs in order to contain the ammonia and/or may, under some circumstances, result in ammonia losses. Also, the potassium chloride salt is dissolved at ambient temperature to maintain the free ammonia in solution, resulting in a relatively slow dissolution rate that may be offset in part with the use of a relatively large and expensive reaction vessel.

From the above, it would be desirable if further advances in flue gas desulfurization processes were available to produce potassium sulfate as a valuable byproduct.

BRIEF DESCRIPTION OF THE INVENTION

The present invention provides processes, systems, and equipment capable of producing potassium sulfate as a byproduct of a desulfurization process, for example, during the removal of sulfur dioxide from flue gases produced by utility and industrial facilities.

According to one aspect of the invention, a process for removing sulfur dioxide from a flue gas includes absorbing the sulfur dioxide from the flue gas using an ammonia-containing solution to produce an ammonium sulfate solution that contains dissolved ammonium sulfate. At least a first portion of the ammonium sulfate solution is heated and delivered to a vessel in which the ammonium sulfate solution dissolves potassium chloride and first potassium sulfate crystals precipitate to form a slurry that contains the first potassium sulfate crystals and an ammonium chloride solution. The ammonium chloride solution contains dissolved ammonium chloride and a first residual amount of the dissolved potassium sulfate. The slurry is then cooled to precipitate second potassium sulfate crystals from the first residual amount of the dissolved potassium sulfate in the ammonium chloride solution, after which the first and second potassium sulfate crystals are removed from the ammonium chloride solution to yield a first residual ammonium chloride solution that contains the dissolved ammonium chloride and a second residual amount of the dissolved potassium sulfate. Ammonia is then absorbed into the first residual ammonium chloride solution to precipitate third potassium sulfate crystals from the second residual amount of the dissolved potassium sulfate in the first residual ammonium chloride solution, and the third potassium sulfate crystals are removed from the first residual ammonium chloride solution to yield a second residual ammonium chloride solution that contains free ammonia and the dissolved ammonium chloride and is substantially free of the dissolved potassium sulfate.

Another aspect of the invention is a system configured and adapted with means for performing the steps of the process described above.

Technical effects of a process and system as described above preferably include the ability to reduce the complexity and/or cost of producing potassium sulfate as a byproduct of a desulfurization process. In particular, the process and system are capable of producing relatively large potassium sulfate crystals that can be more easily filtered and handled, and such crystals tend to contain little if any free ammonia. As another preferred aspect, the process and system are further capable of dissolving potassium chloride at a sufficiently high temperature that can dramatically increase the rate of dissolution, which offers the potential advantages of using a dissolution vessel of smaller size while still achieving complete dissolution of potassium chloride and the production of a chloride-free potassium sulfate byproduct. Further technical effects include the ability to reduce risks of ammonia losses by limiting the presence and amounts of free ammonia within the system and process steps.

Other aspects and advantages of this invention will be better appreciated from the following detailed description.

DETAILED DESCRIPTION OF THE INVENTION

Figure 1:
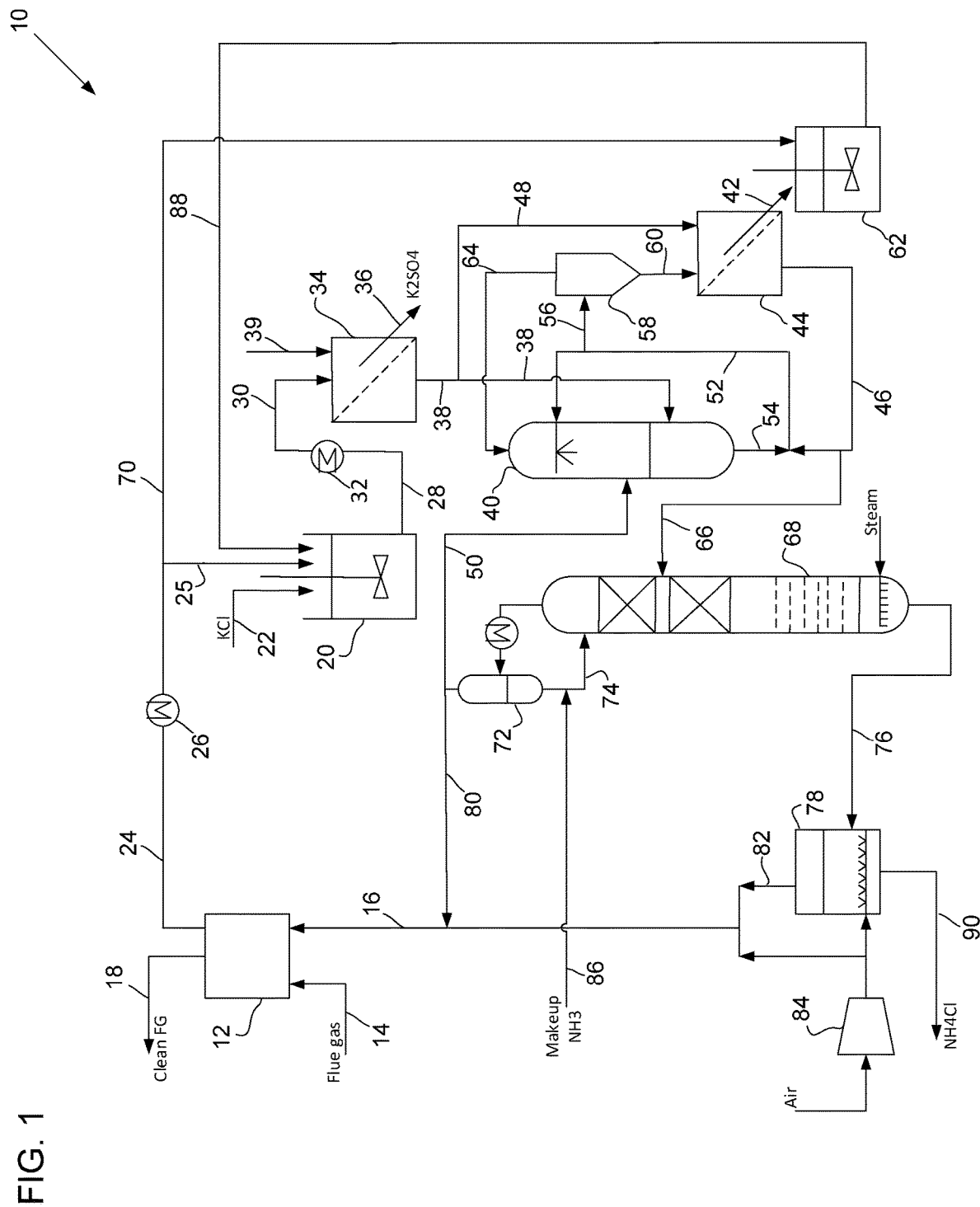
FIGS. 1 and 2 are schematic representations of flue gas desulfurization systems and processes in accordance with nonlimiting embodiments of the invention.
Figure 2:
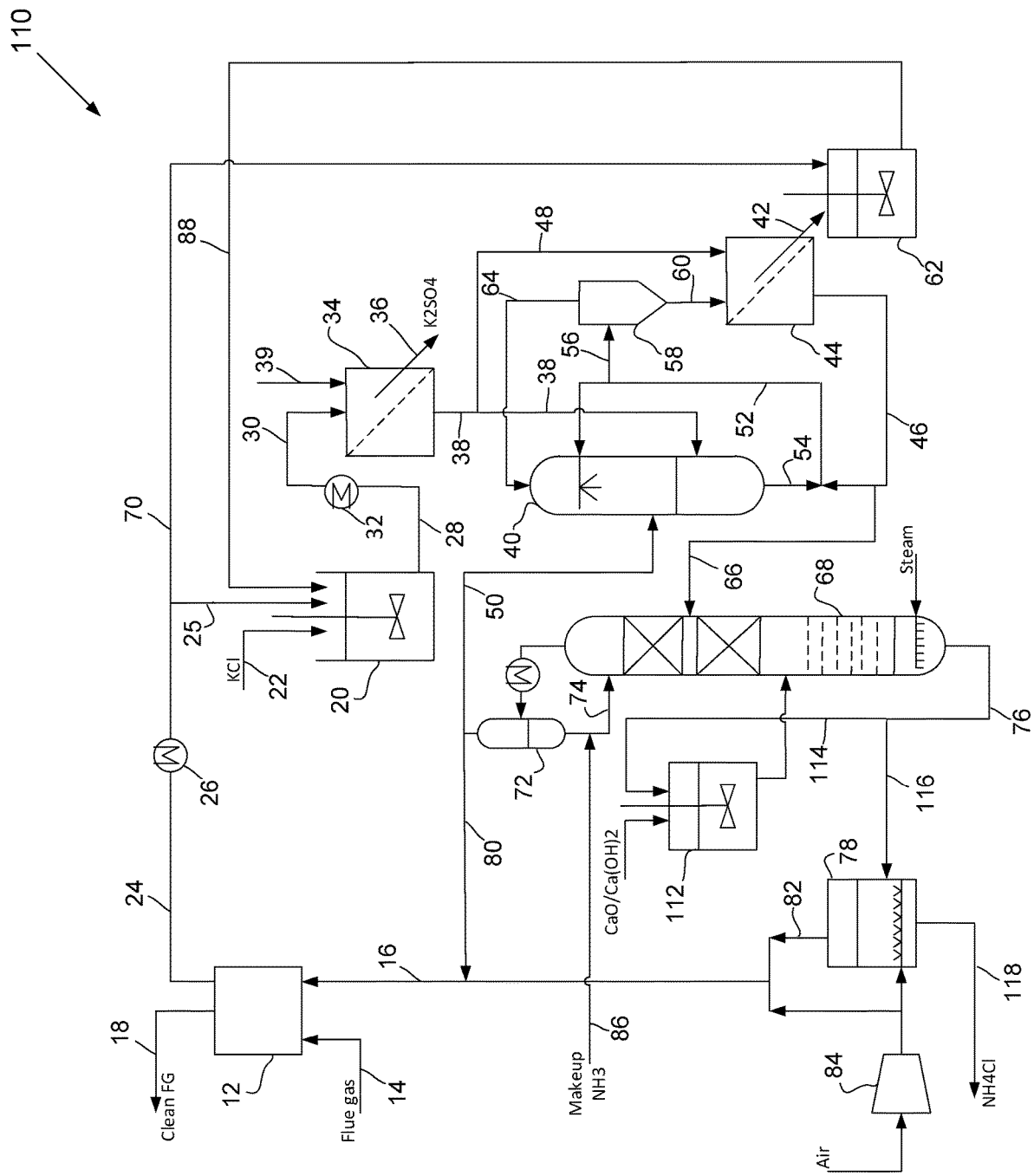

FIGS. 1 and 2 schematically represent flue gas desulfurization (FGD) systems and processes adapted to remove gaseous sulfur dioxide that is entrained in a flue gas through the use of an ammonia-containing solution to produce potassium sulfate as a useful byproduct. Feed chemicals utilized in the process include sulfur dioxide (present in a flue gas), potassium chloride (potash), and ammonia. In preferred embodiments, the potassium sulfate byproduct is of high purity, fully soluble, and in the form of large crystals that are easy to filter, handle, and use as a fertilizer. As will be discussed in reference to FIG. 1, the process and system can also produce a high concentration ammonium chloride ($NH_4Cl$) solution that can be used to produce ammonium chloride crystals that are also suitable for use as fertilizer. Alternatively, as will be discussed below in reference to FIG. 2, the process and system can be adapted to use lime or hydrated lime to recover free ammonia from the ammonium chloride solution and produce a highly concentrated calcium chloride ($CaCl_2$), which can be further processed to produce solid calcium chloride salt for various applications.

While the invention will be described in reference to the depicted desulfurization systems and processes utilizing absorbers, those skilled in the art will recognize that the teachings of this invention can be readily applied to various other desulfurization systems, including gas-liquid contactors, scrubbing structures, and various other equipment capable of enabling the processes described for this invention. Furthermore, desulfurization systems and processes of this invention are compatible with various systems capable of removing other undesirable gases, mist, dust, fumes, smoke and/or particulate matter from streams of gases. All such alternatives and variations are within the scope of the invention.

FIG. 1 is a schematic view of a flue gas desulfurization system 10 in accordance with a first nonlimiting embodiment of this invention. As shown in FIG. 1, an absorber 12 is supplied with a flue gas through an inlet 14, and sulfur dioxide in the flue gas is reacted within the absorber 12 to produce ammonium sulfate. More particularly, sulfur dioxide is reacted with ammonia introduced into the absorber 12 through an inlet stream 16, with the initial reaction producing ammonium sulfite (($NH_4)_2SO_3$) and/or ammonium bisulfite ($NH_4HSO_3$). FIG. 1 depicts oxidation air as also being supplied through the inlet stream 16, which promotes the conversion of sulfites to sulfates through in situ forced oxidation such that the byproduct of the reaction within the absorber 12 is predominantly or entirely ammonium sulfate (($NH_4)_2SO_4$) in solution. As a nonlimiting example, the absorber 12 may be operated to generate an aqueous ammonium sulfate solution that contains dissolved ammonium sulfate. As a nonlimiting example, the aqueous ammonium sulfate solution may contain about 25 to about 45 weight percent dissolved ammonium sulfate in water, with the water being present as a result of being introduced into the absorber 12 to provide a wash solution.

The source of the flue gas may be any process involving the combustion of fossil fuels or various industrial operations by which undesirable gases or particulate matter are produced, encompassing a wide variety of potential environmental pollutants and contaminants. The ammonia introduced into the absorber 12 through the inlet stream 16 is represented in FIG. 1 as being supplied with ammonia from multiple sources, which in the particular nonlimiting embodiment includes ammonia streams 80 and 82 that draw ammonia from a pair of ammonia strippers 68 and 78, the former of which may also supplemented through a makeup ammonia stream 86. While a single inlet stream 16 is shown, it is foreseeable that ammonia and air could be supplied to the absorber 12 separately or in other combinations through any number of streams.

The absorber 12 may physically operate in a generally conventional manner for the purpose of contacting the flue gas and removing sulfur dioxide therefrom, such that the sulfur dioxide is reacted to form ammonium sulfate. The absorption process may involve spraying the ammonia into the absorber 12 so as to provide intimate contact with the flue gas that promotes the absorption of sulfur dioxide and other acid gases, such as hydrogen chloride (HCl) and hydrogen fluoride (HF) if present in the flue gas. If hydrogen chloride and/or hydrogen fluoride are present in the flue gas, as is often the case with flue gas produced by the combustion of coal, these acidic gases may be reacted within the absorber 12 to form ammonium chloride and ammonium fluoride. Afterwards the scrubbed flue gas can be delivered to a stack or other suitable equipment (not shown) through an outlet 18 located at the upper end of the absorber 12. The absorber 12 preferably operates at high efficiency to produce a clean flue gas that has a low sulfur dioxide content, as a nonlimiting example, about 1 to about 10 percent of the sulfur dioxide introduced in the inlet stream 14.

As taught in U.S. Pat. No. 5,624,649, the flue gases may also be contacted with an aqueous ammonium sulfate solution introduced into the absorber 12, in which case the ammonium sulfate solution may serve as a liquid vehicle for delivering the ammonia to the absorber 12, yielding an ammonia-containing solution. Such an ammonium sulfate solution may also serve to control the pH in the absorber 12 within a suitable range, for example, about 4 to 6 pH range, such that the solution is highly reactive for high efficient capture of sulfur dioxide.

A fraction 25 of the ammonium sulfate solution produced in the absorber 12 is sent to a dissolution vessel 20, to which potassium chloride (KCl) 22 is also introduced and dissolved. The vessel 20 is preferably an agitated vessel or a series of vessels. The ammonium sulfate solution, shown as drawn as a stream 24 from the absorber 12, is typically at an elevated temperature, a nonlimiting example being a range of about 50 to about 60° C. FIG. 1 represents the temperature of the ammonium sulfate solution stream 24 as being increased by heating in a heat exchanger 26. Increasing the temperature of the ammonium sulfate solution, as a nonlimiting example, to about 60 to about 120° C., serves to increase the rate of potassium chloride dissolution in the vessel 20, thereby reducing the size of the vessel 20 required to dissolve the potassium chloride 22.

Due to the common ion effect and low solubility of potassium sulfate relative to that of potassium chloride, the potassium chloride 22 introduced into the vessel 20 dissolves and potassium sulfate precipitates within the vessel 20, resulting in the formation of a slurry 28 that is drawn from the vessel 20. In addition to the potassium sulfate precipitates, the slurry 28 comprises an ammonium chloride solution that contains dissolved ammonium ($NH_4^+$), chloride ($Cl^-$), potassium ($K^+$), and sulfate ($SO_4^=$) ions, but little if any free ammonia ($NH_3$). The amount of potassium chloride 22 introduced into the vessel 20 is preferably controlled in such a way that the $K^+/SO_4^=$ mole ratio in the vessel 20 allows for a small excess of potassium ions above stoichiometry (2) for potassium sulfate, for example, about 2.01, in such a way that the sulfate content of the ammonium chloride solution in the slurry 28 is very low, preferably below 1 weight percent. The chloride content of the potassium sulfate precipitates in the slurry 28 can be minimized by ensuring complete dissolution of the potassium chloride. The potassium sulfate precipitates that form in the slurry 28 tend to be relatively large crystals, for example, preferably having an average major dimension of at least 0.7 mm, typically in the range of about 1 to 3 mm, and therefore can be readily separated from the ammonium chloride solution by filtering. Significantly, the potassium sulfate precipitates that form in the slurry 28 tend to be much larger than those produced by the process of U.S. Pat. No. 5,624,649 as a result of the presence of free ammonia in the solution of the latter and little if any free ammonia in the ammonium chloride solution that forms in the vessel 20. In the absence of free ammonia, potassium sulfate crystals tend to be much larger due to slower precipitation.

Though the solubility of potassium sulfate is relatively low compared to that of other salts in the slurry 28, it is estimated that roughly 10 to 25 percent of the total potassium sulfate produced in the dissolution vessel 20 remains in the ammonium chloride solution of the slurry 28. Further precipitation of potassium sulfate can be achieved by cooling the slurry 28 with a heat exchanger 32, yielding a cooler slurry 30, as a nonlimiting example, at about 60° C. or lower, such as about 20 to about 60° C. Because a saturated solution may result in scale on surfaces of the heat exchanger 32, in preferred embodiments the heat exchanger 32 is a direct contact cooler with cooling air. FIG. 1 shows the cooled slurry 30 being delivered to a filter unit 34, where the large potassium sulfate crystals are separated from the ammonium chloride solution within the slurry 30 to yield a stream of potassium sulfate crystals 36 and a filtrate (mother liquor) stream 38, the latter of which is largely an ammonium chloride solution that contains dissolved ammonium chloride (i.e., chloride and ammonium ions) but also contains dissolved potassium sulfate that did not precipitate in the vessel 20 and heat exchanger 32. A stream 39 of wash water can be used to wash the potassium sulfate crystals 36 and filtrate stream 38, and thereafter the potassium sulfate crystals 36 may be sent to a dryer and to storage (not shown).

Recovery of the potassium sulfate that remains dissolved in the filtrate stream 38 can be achieved by salting it out of the ammonium chloride solution in the filtrate stream 38 using free ammonia. In the embodiment of FIG. 1, the free ammonia is introduced with an ammonia absorber 40 to yield a free ammonia-containing slurry 54, as discussed in more detail below. The free ammonia causes precipitation of the potassium sulfate, yielding additional potassium sulfate crystals that can be removed with a second filter unit 44 to yield a second stream (filter cake) of potassium sulfate crystals 42 and a free ammonia-containing filtrate (mother liquor) stream 46, the latter of which is largely an ammonium chloride solution that contains chloride and ammonium ions but little if any potassium sulfate (for example, less than 1 weight percent). The potassium sulfate crystals 42 tend to be significantly smaller than the crystals 36 previously filtered with the first filter unit 34, for example, an average major dimension of 0.2 mm or less, as a result of the presence of free ammonia in the slurry 54.

A small portion 48 of the filtrate stream 38 can be used to wash the potassium sulfate crystals 42. The balance of the filtrate stream 38 is fed to the ammonia absorber 40, where anhydrous ammonia, introduced via a stream 50, is absorbed in the filtrate stream 38 to provide the free ammonia for precipitating the potassium sulfate, yielding the slurry 54 that contains free ammonia, as a nonlimiting example, about 5 to about 30% by weight of free ammonia. FIG. 1 represents the ammonia and filtrate stream 38 within the absorber 40 as combined with a recycled slurry 52 that contains the slurry 54 drawn from the absorber 40 and the filtrate stream 46 exiting the second filter unit 44. Consequently, the recycled slurry 52 contains free ammonia as a result of the slurry 54 and filtrate stream 46 containing free ammonia. The free ammonia concentration in the resulting solution within the absorber 40 dramatically reduces the solubility of dissolved salts (including potassium sulfate) introduced into the absorber 40 by the filtrate stream 38 and recycled slurry 52, such that most of the potassium sulfate in the solution within the absorber 40 precipitates.

A portion 56 of the recycled slurry 52 is fed to the filter unit 44 where the precipitated potassium sulfate crystals 42 are filtered out. FIG. 1 represents the optional use of a hydroclone 58 to concentrate the recycled slurry portion 56 and yield a concentrated slurry stream 60, which reduces the volume of the slurry fed to the filter unit 44. The portion 48 of the filtrate stream 38 can be used to wash the resulting free ammonia-containing filtrate stream 46 from the potassium sulfate crystals 42, which are fed to a dissolution vessel 62 (discussed below). Except for a bleed stream 66, the filtrate stream 46 is returned to the absorber 40 with the recycled slurry 54 as described above. FIG. 1 also shows an overflow stream 64 of the hydroclone 58 as being returned to the absorber 40. As discussed below, the bleed stream 66 of the filtrate stream 46 is sent to the ammonia stripper 68 for recovery of free ammonia.

Another fraction of the ammonium sulfate produced in the $SO_2$ absorber 12 can be sent to the dissolution vessel 62 to dissolve the washed potassium sulfate potassium sulfate crystals 42 exiting the filter unit 44. The potassium sulfate crystals 42 precipitated in the absorber 40, filtered in the filter unit 44, and then dissolved in the vessel 62 represents the aforementioned roughly 10 to 25% of the total potassium sulfate that was produced in the dissolution vessel 20 but remained dissolved in the ammonium chloride solution of the slurry 28. In addition to being typically smaller than the crystals 36 precipitated in the vessel 20 and filtered in the filter unit 34, after being washed in the filter unit 44 the crystals 42 typically have a residual concentration of chlorides and a very low concentration of free ammonia. The potassium sulfate crystals 42 are dissolved in the dissolution vessel 62 in a portion 70 of the stream 24 of ammonium sulfate solution drawn from the absorber 12. As previously noted, the ammonium sulfate solution drawn from the absorber 12 will typically be in a temperature range of about 50 to about 60° C., and the temperature of the ammonium sulfate solution may be increased to a temperature of about 60 to about 120° C. by heating the solution in the heat exchanger 26. As such, the temperature of the ammonium sulfate solution delivered to the dissolution vessel 62 is also elevated, which increases the rate of potassium sulfate dissolution in the vessel 62. After the dissolution of the potassium sulfate crystals 42, the resulting ammonium sulfate solution can be drawn from the vessel 62 and returned to the dissolution vessel 20 via the stream 88.

The ammonia stripper 68 that receives the bleed stream 66 of the filtrate stream 46 for recovery of free ammonia can be a conventional ammonia stripper, for example, by utilizing steam that is directly injected at a lower end of the stripper 68 as live steam as shown in FIG. 1, and/or with the use of a heat exchanger reboiler (not shown). The free ammonia stripped from the bleed stream 66 preferably enters a condenser separator 72, from which the resulting anhydrous ammonia can be recycled to the ammonia absorber 40 via the stream 50 as well as recycled to the absorber 12 via the stream 80. As represented in FIG. 1, aqueous ammonia from the condenser separator 72 can be used as a reflux for the ammonia stripper 68. Makeup ammonia is represented as being added to the absorber 40 via the makeup ammonia stream 86. While represented as being introduced through the reflux stream 74, such that makeup ammonia is also provided to the absorber 40 via the stream 50 and to the absorber 12 via the stream 80, the makeup ammonia can be added at various different locations, including directly into the absorber 40 or directly to the stream 50 that recycles the anhydrous ammonia to the ammonia absorber 40. The amount of makeup ammonia required by the system 10 should ordinarily be minimal due to very low levels of ammonia losses from the system 10. As such, the desulfurization process is capable of reducing the need to transport and store large quantities of ammonia on site.

As noted above, the filtrate stream 46 is largely an ammonium chloride solution that contains free ammonia, chloride, and ammonium ions and little if any potassium sulfate. As such, the stripper 68 produces a stream 76 of an ammonium chloride solution with reduced free ammonia and very low concentrations of potassium and sulfate ions. Further removal of residual ammonia from this ammonium chloride solution can optionally be performed with the ammonia stripper 78 using oxidation air, for example, supplied by a compressor 84 that also supplies the air for the inlet stream 16 to the absorber 12 as shown. The stream 82 of the residual ammonia stripped from the stream 66 of ammonium chloride solution can then be fed to the absorber 12 along with the oxidation air via the inlet stream 16. In combination, the strippers 68 and 78 preferably operate so that essentially all of the free ammonia (e.g., 50, 80 and 82) within the system 10 is used in the absorber 12 to absorb sulfur dioxide from the flue gas 14 and/or used in the absorber 40 to precipitate the potassium sulfate crystals 42. The resulting stream 90 obtained from the stripper 78 is an ammonium chloride solution that contains practically no free ammonia and may be used as a fertilizer solution or crystalized for use in a solid form.

As previously noted, FIG. 2 depicts a system 110 that offers the ability to produce calcium chloride ($CaCl_2$) as an alternative or in addition to ammonium chloride. The system 110 provides this capability with the addition of an agitated dissolution vessel (or vessels) 112 in which lime (calcium oxide; CaO) and/or hydrated lime (calcium hydroxide; $Ca(OH)_2$) can be used to recover ammonia from the stream 66 of ammonium chloride solution and produce highly concentrated calcium chloride which can be further processed to produce solid calcium chloride salt for various applications. FIG. 2 shows the lime or hydrated lime as being combined with a bleed stream 114 drawn from the stream 76 produced by the ammonia stripper 68. Within the vessel 112, the ammonium chloride reacts with the lime or hydrated lime to produce a lime solution, which is then introduced into the ammonia stripper 68 to react with the ammonium chloride solution therein and produce calcium chloride and ammonia as follows:

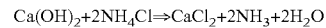

$$Ca(OH)_2 + 2NH_4Cl \Rightarrow CaCl_2 + 2NH_3 + 2H_2O$$

Both free ammonia and ammonia from the ammonium chloride and lime solutions are preferably stripped in the ammonia stripper 68, such that the resulting streams 76, 114, and 116 are essentially highly concentrated calcium chloride solutions. As was discussed in reference to FIG. 1, further removal of residual ammonia from the ammonium chloride solution 116 can optionally be performed with the ammonia stripper 78, such that the resulting stream 118 is essentially a highly concentrated calcium chloride solution that contains practically no free ammonia and may be used as a fertilizer solution or crystalized for use as a solid calcium chloride product.

EXAMPLE

Table 1 below provides an estimated material balance that is based on an ammonium sulfate solution (drawn from the absorber 12 via the stream 24) that contains 1000 grams (55.556 gmole) of water and 550 grams (4.167 molal) of dissolved ammonium sulfate. The ammonium sulfate solution within the stream 24 is heated by the heat exchanger 26 to 100° C. and introduced into the vessel 20, where ammonium sulfate solution dissolves most of the potassium chloride 22 introduced into the vessel 20. The resulting slurry 28 contains 0.82 molal of potassium sulfate, of which 88 percent is dissolved in the ammonium sulfate solution. In tandem with dissolving 8.389 molal of potassium chloride into the solution, 3.534 molal of potassium sulfate precipitates. Further precipitation to a total of 4.053 molal is achieved by cooling the slurry 28 to about 40° C. with the heat exchanger 32, after which the cooled slurry 30 is filtered with the filter unit 34 and the resulting potassium sulfate crystals 36 are washed. The balance of the potassium sulfate precipitation still dissolved in the filtrate stream 38 of largely ammonium chloride (in this example, about 20 percent of the total potassium sulfate formed in the vessel 20) precipitates in the absorber 40 where 14.705 molal of free ammonia is added to the filtrate stream 38, forming the slurry 54 from which the finer potassium sulfate precipitates are separated with the filter unit 4. The stream 76 of residual ammonium chloride solution contains less than 1 weight percent of the potassium and sulfate originally introduced into the system 10.

The mass balance of Table 1 shows that 550 grams of ammonium sulfate consumed 625 gram potassium chloride to produce 705 grams of potassium sulfate and about 1450 grams of ammonium chloride solution containing 450 grams of dissolved ammonium chloride salts in 1000 grams of water.

On the basis of the above, it is believed that a commercial system treating 1,000,000 $Nm^3/hr$ of flue gas containing 1000 ppm of sulfur dioxide that is captured at 99% efficiency would utilize about 1500 Kg/hr of ammonia to capture a total of 2828 Kg/hr of sulfur dioxide and produce 5834 kg/hr of ammonium sulfate solution in 10,607 kg/hr of water. The system would also consume 6700 kg/hr of potassium chloride and produce 7500 kg/hr potassium sulfate and about 15,000 kg/hr of ammonium chloride solution, which could be sold as-is, processed to produce a solid, and/or treated to recover ammonia (FIG. 1) and/or processed to produce a calcium chloride solution or solid (FIG. 2).

TABLE 1

| Stream | $NH_4^+$ | $SO_4^=$ | $K^+$ | $Cl^-$ | $K_2SO_4$ | $H_2O$ | Free $NH_3$ | T (° C.) |
|---|---|---|---|---|---|---|---|---|
| 24 | 8.333 | 4.167 | 0.000 | 0.000 | 0.000 | 55.556 | 0.000 | 100 |
| 88 | 8.356 | 4.885 | 1.437 | 0.023 | 0.102 | 55.556 | 0.000 | 100 |
| 22 | 0.000 | 0.000 | 8.389 | 8.389 | 0.000 | 0.000 | 0.000 | 30 |
| 28 | 8.356 | 1.356 | 2.767 | 8.389 | 3.534 | 55.556 | 0.000 | 100 |
| 30 | 8.356 | 0.832 | 1.720 | 8.389 | 4.053 | 55.556 | 0.000 | 40 |
| 36 | 0.000 | 0.000 | 0.000 | 0.000 | 4.053 | 2.000 | 0.000 | 40 |
| 38 | 8.356 | 0.832 | 1.720 | 8.389 | 0.000 | 55.556 | 0.000 | 40 |
| 60 | 8.356 | 0.012 | 0.080 | 8.389 | 0.820 | 55.556 | 14.705 | 40 |
| 42 | 0.000 | 0.000 | 0.000 | 0.000 | 0.820 | 0.000 | 0.000 | 40 |
| 66 | 8.356 | 0.012 | 0.080 | 8.389 | 0.000 | 55.556 | 14.705 | 40 |
| 76 | 8.356 | 0.012 | 0.080 | 8.389 | 0.000 | 55.556 | 0.000 | 40 |

While the invention has been described in terms of specific embodiments, it is apparent that other forms could be adopted by one skilled in the art. For example, the physical configurations of the systems 10 and 110 could differ from those shown, and alternative and/or additional components, materials, processes and steps other than those noted could be used. Therefore, the scope of the invention is to be limited only by the following claims.

The invention claimed is:

1. A system for removing sulfur dioxide from a flue gas, the system comprising:
    an absorber having an inlet for receiving the flue gas;
    an inlet stream that introduces an ammonia-containing solution into the absorber to absorb sulfur dioxide from the flue gas to produce an ammonium sulfate solution that contains dissolved ammonium sulfate;
    a first vessel that is connected to the absorber, contains at least a heated first portion of the ammonium sulfate solution received from the absorber, and is connected to a source of potassium chloride to receive the potassium chloride therefrom, wherein within the first vessel the ammonium sulfate solution dissolves the potassium chloride and precipitates first potassium sulfate crystals to form a slurry that contains the first potassium sulfate crystals and an ammonium chloride solution, the ammonium chloride solution within the first vessel containing dissolved ammonium chloride and a first residual amount of dissolved potassium sulfate;
    a cooling device connected to the first vessel and through which the slurry flows for cooling the slurry to precipitate second potassium sulfate crystals from the first residual amount of the dissolved potassium sulfate in the ammonium chloride solution;
    a first filter unit that is connected to the cooling device, receives the ammonium chloride solution therefrom, and removes the first and second potassium sulfate crystals from the ammonium chloride solution to yield a first residual ammonium chloride solution that contains the dissolved ammonium chloride and a second residual amount of the dissolved potassium sulfate;
    an ammonia absorber that is connected to the first filter unit, receives the first residual ammonium chloride solution therefrom, and within which ammonia is absorbed into the first residual ammonium chloride solution to precipitate third potassium sulfate crystals from the second residual amount of the dissolved potassium sulfate in the first residual ammonium chloride solution; and
    a second filter unit that is connected to the ammonia absorber, receives the first residual ammonium chloride solution therefrom, and removes the third potassium sulfate crystals from the first residual ammonium chloride solution to yield a second residual ammonium chloride solution that contains free ammonia and the dissolved ammonium chloride and is free of the dissolved potassium sulfate.

2. The system according to claim 1, further comprising a second vessel wherein:
    the second vessel is connected to the second filter unit, receives the third potassium sulfate crystals from the second filter unit, and dissolves the third potassium sulfate crystals in a second portion of the ammonium sulfate solution; and
    the second vessel is connected to the first vessel for delivering the second portion of the ammonium sulfate solution to the first vessel.

3. The system according to claim 1, further comprising a first stripper connected to the second filter unit for recovering at least a portion of the free ammonia from the second residual ammonium chloride solution to produce a third residual ammonium chloride solution that contains the dissolved ammonium chloride and a reduced amount of free ammonia.

4. The system according to claim 3, further comprising a second stripper connected to the first stripper for recovering an additional portion of the free ammonia from the third residual ammonium chloride solution to produce an ammonia-free ammonium chloride solution that contains the dissolved ammonium chloride.

5. The system according to claim 4, wherein the second stripper is connected to the absorber for delivering the additional portion of the free ammonia and the air to the absorber to assist in the absorbing of the sulfur dioxide from the flue gas to produce the ammonium sulfate solution.

6. The system according to claim 1, further comprising a third vessel connected to the second filter unit for reacting the second residual ammonium chloride solution with lime and/or hydrated lime and a separator for recovering at least a portion of the free ammonia and ammonium ions therefrom and produce a calcium chloride solution.

7. The system according to claim 6, further comprising a stripper connected to the second filter unit for recovering any remaining portion of the free ammonia from the calcium chloride solution to produce an ammonia-free calcium chloride solution.

8. The system according to claim 1, wherein all of the free ammonia within the system is either delivered to the absorber to absorb sulfur dioxide from the flue gas or delivered to the ammonia absorber to be absorbed into the first residual ammonium chloride solution to precipitate the third potassium sulfate crystals.

* * * * *